United States Patent [19]

Aoyama

[11] Patent Number: 5,455,747
[45] Date of Patent: Oct. 3, 1995

[54] VEHICLE LIGHTING DEVICE

[75] Inventor: Tomonori Aoyama, Shizuoka, Japan

[73] Assignee: Koito Manufacturing Co., Ltd., Tokyo, Japan

[21] Appl. No.: 265,159

[22] Filed: Jun. 24, 1994

[30] Foreign Application Priority Data

Jun. 24, 1993 [JP] Japan .................... 5-175953

[51] Int. Cl.⁶ .................................. B60Q 1/26
[52] U.S. Cl. .................. 362/61; 362/80.1; 362/308; 359/19
[58] Field of Search ............ 362/61, 80.1, 800, 362/83.3, 253, 812, 293, 308, 311, 260, 317, 331, 296; 359/19.1, 20.15; 340/479

[56] References Cited

U.S. PATENT DOCUMENTS

| | | | |
|---|---|---|---|
| 4,536,833 | 8/1985 | Davis | 362/308 |
| 4,855,877 | 8/1989 | Otaka | 362/61 |
| 4,868,725 | 9/1989 | Sakagawa et al. | 362/231 |
| 4,912,606 | 3/1990 | Yamamoto | 362/61 |
| 4,951,179 | 8/1990 | Machida | 362/61 |
| 4,966,426 | 10/1990 | Moss et al. | 362/80.1 |
| 5,062,027 | 10/1991 | Machida et al. | 362/80.1 |
| 5,093,768 | 3/1992 | Ohe | 362/800 |
| 5,101,193 | 3/1992 | Smith | 362/80.1 |
| 5,347,435 | 9/1994 | Smith | 362/61 |

*Primary Examiner*—James C. Yeung
*Attorney, Agent, or Firm*—Sughrue, Mion, Zinn, Macpeak & Seas

[57] ABSTRACT

A lighting device includes a lighting device body, a light source placed within the lighting device body, a lens mounted in the front opening of the lighting device body, and a hologram attached to at least one specific area on the lens. At least part of light emitted from the light source is refracted by the hologram and a holographic image recorded in the hologram 16 is reproduced. A desired pattern is recorded is recorded in the form of a holographic image in the hologram. Visual presentation and light distribution characteristics, like those a conventional lighting device having a pattern of lens steps physically formed in the lens surface, can be obtained without additional optical parts.

10 Claims, 4 Drawing Sheets

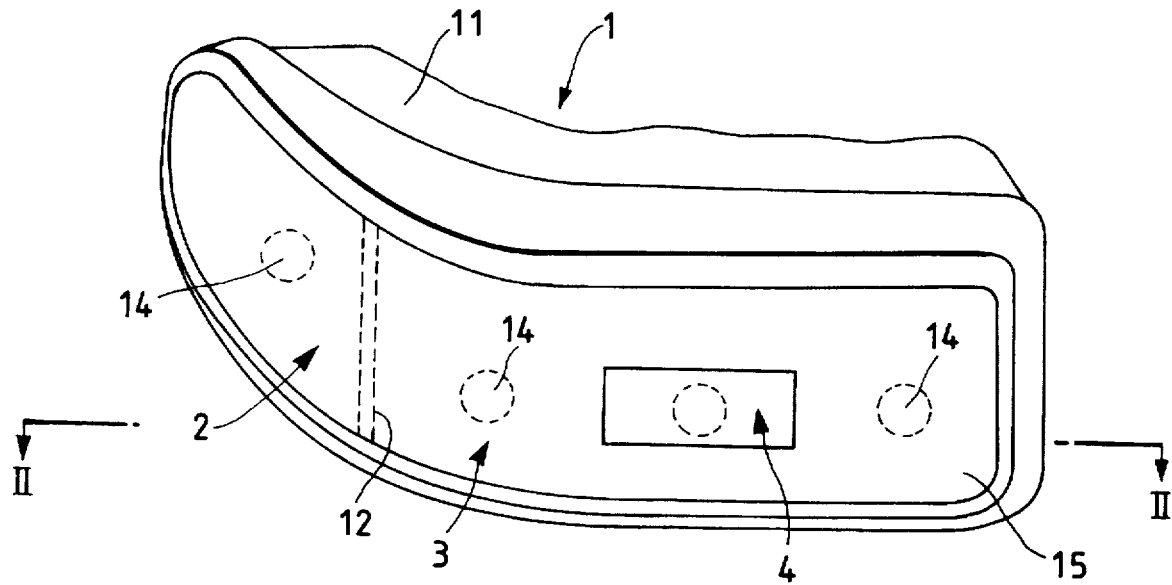
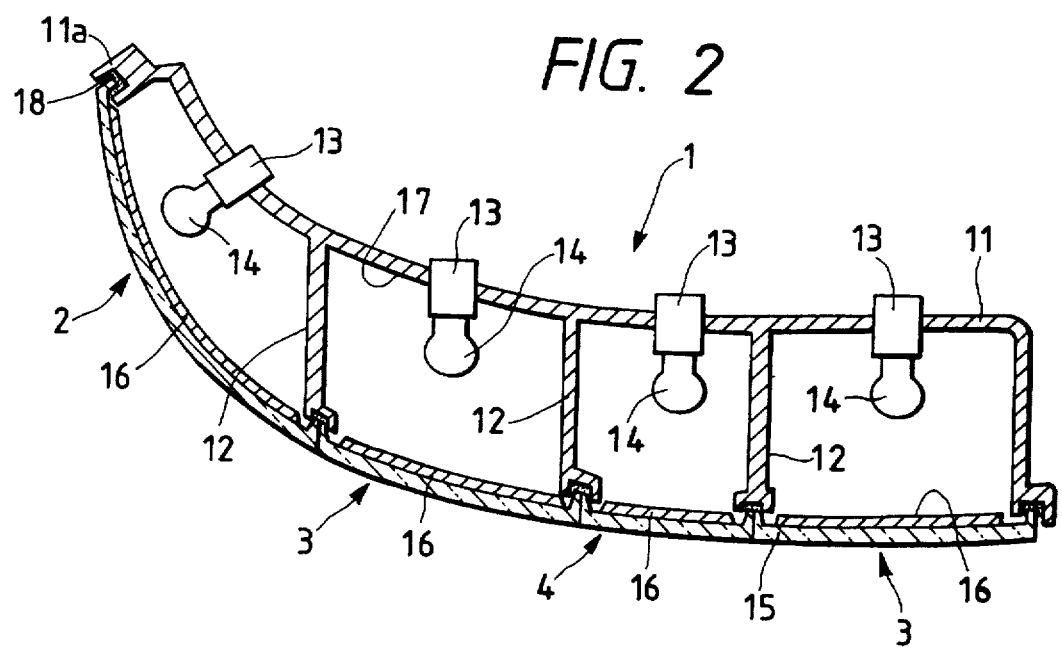

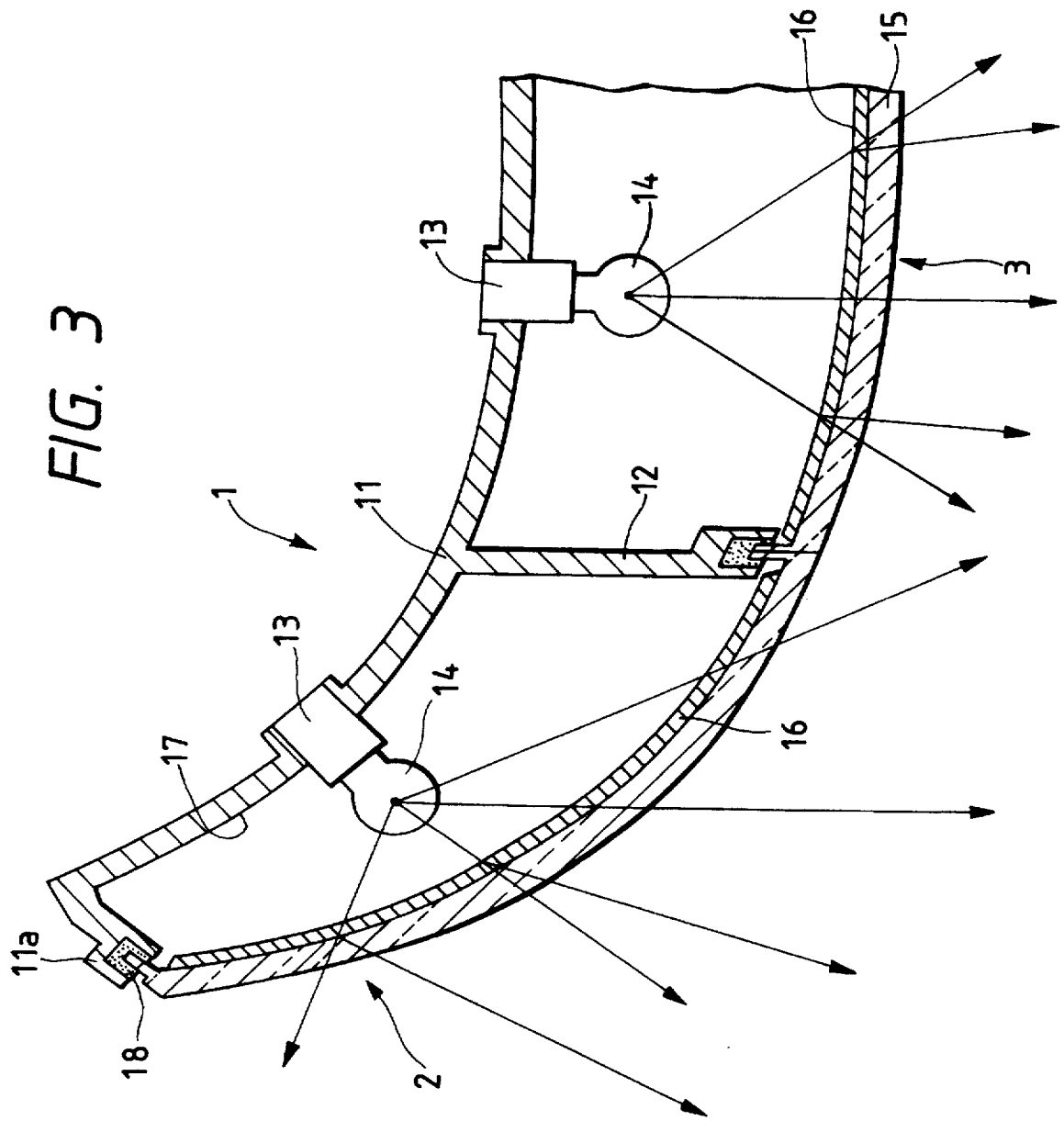

5,455,747

VEHICLE LIGHTING DEVICE

BACKGROUND OF THE INVENTION

1. Field of the Invention

The present invention relates to a lighting device for a vehicle, such as an automobile, for presenting a visual indication to other vehicles.

2. Description of the Related Art

A lighting device for a motor vehicle is generally constructed such that light bulbs are mounted in a body of the lighting device (referred to frequently as a lamp body), and a lens with different patterns of lens steps formed thereon is mounted in the front opening of the body. Recently, some types of lighting devices, such a braking lamp, utilize light emitting diodes (LEDs). To obtain an intended light distribution characteristic irrespective of the types of the light source used, a related pattern of steps for refracting light from the light source must be formed in the surface of lens. To realize a lighting device for directing light from the light source in a present direction by refracting light at a large angle by the lens, the refractive index of resin for the lens and restrictions in designing a pattern of lens steps that can be formed in the lens make it difficult to form a pattern to satisfy required light distribution characteristics.

Typical devices other than the formation of lens steps are thus used to obtain a desired light distribution characteristic. For example, the reflector formed on the lamp body is shaped in a predetermined manner, and additional optical parts, such as an inner lens, provided within the lamp body are employed. The result is to make the shape of the lamp body more complicated, to increase the required number of parts, and consequently to increase the cost to manufacture the device. Additionally, the lamp body and the optical parts must be designed and manufactured specifically for every type of lighting device. In other words, it is almost impossible to use common parts for different types of lighting devices.

Accordingly, an object of the present invention is to provide a lighting device which obtains a desired light distribution characteristic by applying a hologram onto a lens of the lighting device, and realizes simplification of construction, reduction of the required number of parts, and thus allows common parts to be used for different types of lighting devices.

SUMMARY OF THE INVENTION

To achieve the above object, there is provided a lighting device having a lighting device body, a light source placed within the lighting device body, a lens mounted in the front opening of the lighting device body, and a hologram attached to at least one specific area on the lens. At least part of the light emitted from the light source is refracted by the hologram and thus a hologram image recorded in the hologram is reproduced.

BRIEF DESCRIPTION OF THE DRAWINGS

The present invention will be described with reference to the accompanying drawings in which:

FIG. 1 is a perspective view schematically showing a first preferred embodiment of a lighting device according to the present invention;

FIG. 2 is a transverse sectional view, taken along line II—II, showing the lighting device of FIG. 1;

FIG. 3 illustrates a portion of FIG. 2;

DETAILED DESCRIPTION OF THE PREFERRED EMBODIMENTS

Figure 4:
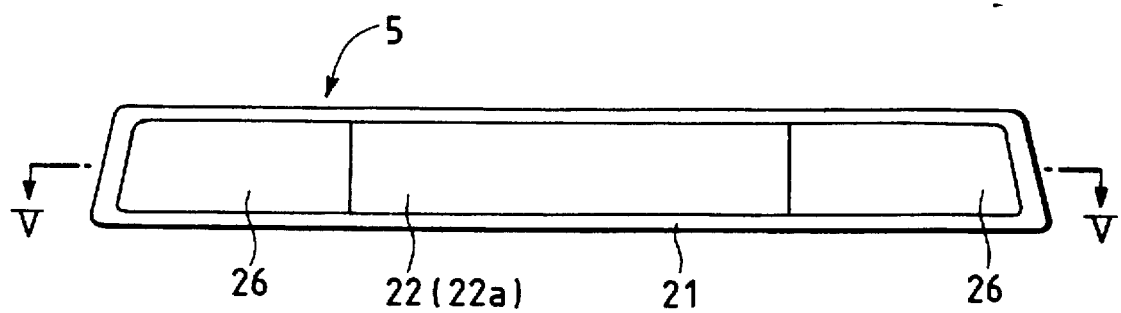
FIG. 4 illustrates a second preferred embodiment of the invention.

In the first embodiment, the present invention is applied to a rear combination lamp (RCL) having a corner part. The RCL is adopted to be mounted on a rear left corner of a car. In these figures, a rear combination lamp 1 includes an RCL body 11, which is curved along the shape of the rear left corner of the car ranging from the rear left part to the rear left side part of the car. The RCL body 11 is an integral construction of a turn signal lamp 2, a tail stop lamp 3, a backup lamp 4, and shades 12 dividing body 11 to define lamp chambers for each of these components. In each lamp chamber, the inner surface of the rear side wall of the RCL body 11 is coated with aluminum, to form a reflector 17 of the corresponding lamp. Also, in each lamp chamber, a bulb 14 is inserted into a socket 13 mounted on the RCL body 11. A lens 15, mounted in the front opening of the RCL body 11, takes the shape curved along the rear left corner of the car. The peripheral edge of the lens is inserted into a peripheral groove 11a of the RCL body 11, and sealed with sealing compound 18.

The lens 15 is a transparent plate of uniform thickness. Further, the lens 15 is gently curved and does not have steps formed thereon for partially refracting light beams. Holograms 16 are attached to the inner surface of the lens 15, in lieu of the conventionally known steps, i.e. raised patterns. The term "hologram" is used herein to refer to any known medium having a latent holographic image recorded thereon in a known manner.

Each hologram 16 can be formed such that a photosensitive layer thereof is layered on a base made of a transparent resin, and a desired pattern of lens steps for a given lamp is photographed by a known holographic technique. When the hologram 16 is exposed to light, light is refracted by the visualized hologram of the photosensitive layer to produce a holographic image and the light emanates from the hologram in a given direction. Through the refracted light, a person sees the virtual holographic image, i.e., the desired pattern of the lens step as photographed.

Holograms 16, designed for the turn signal lamp 2, the tail/stop lamp 3, and the backup lamp 4, are bonded with an adhesive (not shown) to the surface areas of the lens 15 for each lamp, respectively. In this embodiment, a hologram having a base of an amber color is attached to the surface area for the turn signal lamp 2; a hologram having a base of a red color is attached to the surface area for the tail/stop lamp 3; and a hologram having a base of a white color is attached to the surface area for the backup lamp 4.

In the turn signal lamp 2 of the RCL 1 thus constructed, as shown in an enlarged fashion in FIG. 3, light emitted from the bulbs 14 and light reflected by the reflectors 17 emanates from a position off to the left of the back of the car and advances toward the side, passing through the lens 15. When the hologram 16 is exposed to the light beams, part of the light is refracted by the hologram 16 to be directed to the back of the car and in a direction diagonally to the left of the back. The remaining light passes straight through the hologram 16 and is directed to the side of the car. The light beams, when passing through the hologram 16 of turning lamp 2, is colored by the base to have an amber color. Accordingly, the turn signal lamp 2, located at the corner part of the RCL 1 and extended to the side of the car, can be seen from the back of the car, a position off to the left of the back, and the side of the car. Thus, any related regulations can be satisfied.

The hologram 16 contains the desired pattern of lens steps as stated above. This step pattern is reproduced as a three dimensional holographic image. Accordingly, a person, when viewing the turn signal lamp 2, recognizes the familiar raised step pattern. Thus, the turn signal lamp 2 of the invention can provide exactly the same visual presentation as that of the conventional turn signal lamp having the raised lens steps physically formed thereon. Of course, the holographic image can be designed to produce any desired visual effect and direct light in an appropriate manner.

Also in the tail/stop lamp 3 and the backup lamp 4 as shown in FIG. 3 in which a part of the tail/stop lamp 3 is illustrated, part of the light, which is emitted from the bulbs 14 and reflected by reflector 17 is changed in direction through the refraction of the hologram 16, thereby to have a desired light distribution pattern. These lamps thus also visually present the desired patterns of light distribution. In this embodiment, part of light to be emitted in the direction off to the right and left of the back of the car is directed just at the back of the car. Accordingly, a car following the car bearing those lamps can clearly recognize the signals by the lamps. If desired lens steps are printed in the hologram 16 of the lamps, people can recognize the visual presentations, which are the same as those of the conventional lamps having the physically formed raised lens step patterns.

Thus, the turn signal lamp 2 of the RCL 1, which is formed at the corner part thereof, can increase the amount of light directed to the back of the car in a desired manner without requiring a specifically machined lens, or using optical parts for directing light to the back, such as a specifically designed inner lens. In this respect, simplification of the lamp construction and reduction of the number of parts can both be realized. Lighting devices of different light distribution characteristics may be manufactured using-a common RCL body 11 and lenses and by merely changing the holograms alone. Thus, use of common parts for different types of lighting devices is allowed.

In the above-mentioned embodiment, the holograms are attached to all the surface areas of the lens, which respectively correspond to the lamps of the rear combination lamp. If necessary, the hologram may be attached to only the surface area of the lens, which corresponds to the turn signal lamp, located at the corner part, for refracting light at a great angle. In this case, those areas of the lens which correspond to the remaining lamps, the tail/stop and backup lamps 3 and 4, can be a red lens with a desired pattern of raised lens steps and a white lens with a desired pattern of raised lens steps, as in the conventional RCL. Further, a hologram having a white base may be used. In this case, the lens area for the turn signal lamp 2 can be amber in color.

Figure 5:
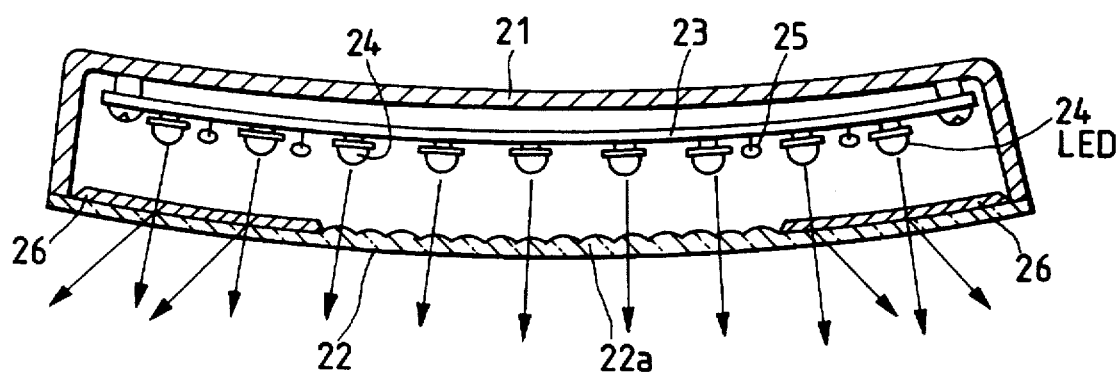
FIG. 5 is a sectional view, taken along line V—V, of the device illustrated in FIG. 4.

FIGS. 4 and 5 are respectively a front view and a transverse sectional view showing a lighting device according to a second embodiment of the present invention. The second embodiment is applied in a highmount stop lamp (HMSL) 5 which uses light emitting diodes (LEDs) as light sources. A lamp body 21 is shaped like a rectangular box gently curved outwardly. A lens 22 is hermetically mounted in the front opening of the lamp body. A base 23, curved along the lamp body, is disposed within the lamp body 21. Many circuit components, such as a number of LEDs 24 emitting red light and resistors 25, are fabricated on the base 23 in a known manner. The base 23 is supplied with electric power from a power source, not shown.

A pattern of raised lens steps 22a are formed on the central area of the inner surface of the lens 22. Holograms 26 containing virtual images of the same lens step patterns as the lens steps pattern 22a, are bonded onto the side areas of the inner surface of the lens 22, located on both sides of the central area, by means of transparent adhesive. The holograms 26 refract light beams to the right and left.

In the HMSL 5 thus constructed, red light emitted from the LEDs 24 is directed to the back of a car to indicate a braking state of the car, through the lens 22. The light, when transmitted through the central area of the lens 22, possesses a preset pattern of light distribution through the refraction by the pattern of the lens steps 22a, and is distributed toward the back. Part of light transmitted through the side areas of the lens 22 is refracted by the holograms 26. Light passing through the right side area of the lens is directed to the left by the other hologram 26. Accordingly, the HMSL 5 emits red light toward the back, while diffusing the red light to the right and left. The HMSL 5 when it is lit can thus be visually recognized over a wide angular viewing range.

More specifically, the central area of the lens 22 presents the preset step pattern by the raised lens steps 22a, and the side areas of the lens present the same step patterns by the holographic images formed by the holograms 26. The same step pattern can be seen in a wide angular range.

In the second embodiment, the holograms 26 are attached to only side areas of the lens. If necessary, the holograms 26 may be attached to all the lens areas, i.e., the central area and both side areas. In this case, different holographic images are photographed in accordance with the light distribution patterns required, and respectively printed as the holograms 26.

In the above-mentioned embodiments, the holograms recording different holographic images are attached to the respective lens areas. Alternatively, a single hologram containing different holographic images recorded in the areas thereof corresponding to the lens areas, may be used. In this case, the single hologram is bonded to the lens in a manner that the hologram areas containing those different hologram images are respectively positioned to correspond to the lens area. Accordingly, desired different light distribution patterns can be obtained by merely attaching the single hologram onto the lens.

Figure 6A:
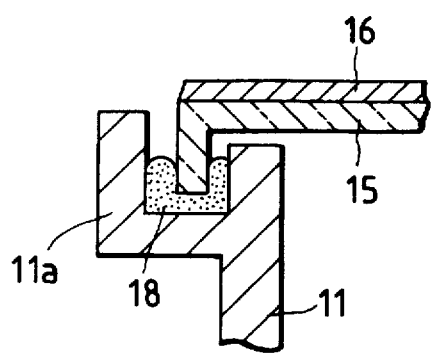
FIGS. 6(a)–6(d) illustrate various ways of attaching a hologram to the lens.
Figure 6B:
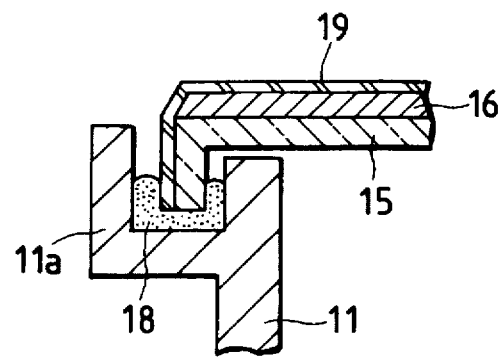
Figure 6C:
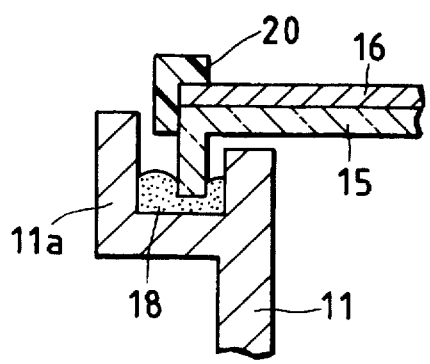
Figure 6D:
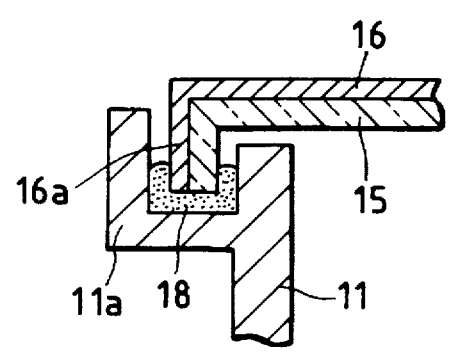

The hologram may also be attached to the outer surface of the lens. FIGS. 6(a)–6(d) show some examples in which a hologram 16 is layered on the outer surface of the lens 15 of the lighting device according to the first embodiment. In the example of FIG. 6(a)–6(d) show some examples in which a hologram 16 is layered on the outer surface of the lens 15 of the lighting device according to the first embodiment. In the example of FIG. 6(a), a hologram 16 is bonded onto the outer surface of the lens 15 by adhesive. In the example of FIG. 6(b), the surface of a hologram 16 bonded onto the outer surface of the lens 15 is covered with a transparent film 19. Use of the transparent film 19 protects the hologram against water, heat, and the like, and further prevents the hologram 16 from being peeled off the outer surface of the lens 15. In the example of FIG. 6(c), the corner defined by the peripheral edge of lens 15 and the edge of the hologram 16 placed on or bonded onto the lens, is firmly held by a rim 20 made of resin. Use of the rim 20 prevents the hologram 16 from peeling off the lens at this corner. In the example of FIG. 6(d), a portion 16a of the hologram 16 is bent along the projecting fringe portion of the lens 15, and the portion 16a, together with the fringe of the lens, is fastened in the peripheral groove 11a of the RCL body 11 by means of sealing compound 18. This construction also prevents the hologram 16 from peeling off the lens at this corner.

Figure 7A:
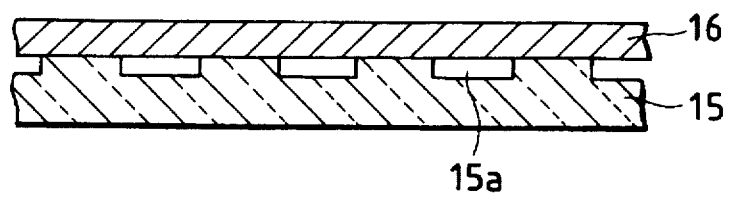
FIGS. 7(a) and 7(b) respectively illustrate ways to define gaps between the hologram and the lens.
Figure 7B:
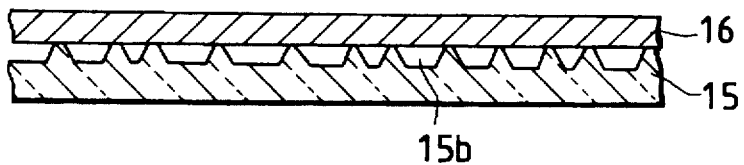

As shown in FIGS. 7(a) and 7(b), long, narrow indentations may be formed in the upper surface of the lens 15 on which the hologram 16 is layered. In the example of FIG. 7(a), long, narrow indentations 15a formed in the upper surface of the lens are uniformly shaped and regularly arrayed. In the example of FIG. 7(b), long, narrow indentations 15b formed in the upper surface of the lens are irregularly shaped and arrayed. Bubbles formed between the lens 15 and the hologram 16 when the lighting device is lit and heated, are allowed to escape outside through these long, narrow indentations 15a and 15b. Problems arising from the generated bubbles, such as unsightly appearance and poor light distribution characteristics can thus be solved.

It is evident that the present invention is applicable to lighting devices other than the RCL and HMSL.

As seen from the foregoing, a lighting device according to the present invention is constructed such that a hologram is attached to at least a part of a lens mounted on a body of a lighting device, and at least part of light emitted from light sources is refracted by the hologram, thereby reproducing a holographic image recorded in the hologram. With such a construction, when a pattern of lens steps, or the like, is recorded in the hologram, light emitted from the lighting device can be refracted in a desired direction. The desired pattern can thus be reproduced in the form of the holographic image. The lighting device of the invention can provide a desired visual presentation while keeping a preset light distribution characteristics, as the conventional lighting device having a pattern of the lens steps physically formed in the lens surface. Further, there is no need for a complicated construction and additional optical parts to obtain the desired light distribution patterns. Accordingly, simplification of the construction and reduction of the required number of parts are both realized. Also, common parts may be applied to different types of lighting devices.

What is claimed is:

1. A lighting device comprising:

a body, defining at least one chamber therein and having an opening formed therein;

a lighting source disposed in said chamber;

a lens mounted in said opening;

a hologram attached to said lens, said hologram having a predetermined holographic image formed therein so that light from said light source is diffracted by said hologram and a desired virtual image is reproduced; and raised structures formed on a side of said lens on which said hologram is disposed, said raised structures defining gaps between said hologram and said lens.

2. A lighting device as claimed in claim 1 wherein said desired virtual image corresponds to a raised stepped pattern.

3. A lighting device as claimed in claim 1, wherein there are a plurality of chambers defined in said body, each of said chambers having a corresponding light source, opening and lens disposed in said opening, at least one of said lens having said hologram thereon.

4. A lighting device as claimed in claim 1, wherein there are a plurality chambers defined in said body, each of said chambers having a corresponding light source, a single lens element being disposed over openings of each chamber, at least a portion of said lens element having said hologram thereon.

5. A lighting device as claimed in claim 3 wherein said housing is curved and said light sources constitute at least a turn lamp, a stop lamp, and a backup lamp of a vehicle.

6. A lighting device as claimed in claim 4 wherein said housing is curved and said light sources constitute at least a turn lamp, a stop lamp, and a backup lamp of a vehicle.

7. A lighting device as claimed in claim 1, wherein said light source is a plurality of LEDs, said hologram covering at least a portion of said lens.

8. A lighting device comprising:

a body, defining at least one chamber therein and having an opening formed therein;

a lighting source disposed in said chamber;

a lens mounted in said opening;

a hologram attached to said lens, said hologram having a predetermined holographic image formed therein so that light from said light source is diffracted by said hologram and a desired virtual image is reproduced; and a projecting portion formed on an edge portion of said lens and extending at an angle with respect to said edge portion, said hologram extending onto said projecting portion, said projection portion having said hologram thereon being attached to said body.

9. A lighting device as claimed in claim 8 further comprising;

a transparent film disposed over said hologram.

10. A lighting device comprising:

a body, defining at least one chamber therein and having an opening formed therein;

a lighting source disposed in said chamber;

a lens mounted in said opening;

a hologram attached to said lens, said hologram having a predetermined holographic image formed therein so that light from said light source is diffracted by said hologram and a desired virtual image is reproduced; and a projecting portion formed on an edge portion of said lens and extending at an angle with respect to said edge portion, an edge of said hologram extending to said projecting portion, said device further comprising a rim member disposed over the edge of said hologram and at least a part of said projecting portion, said projecting being attached to said body.

* * * * *